UNITED STATES PATENT OFFICE.

GUSTAV SPIESS AND ADOLF FELDT, OF FRANKFORT-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

DICANTHARIDYLETHYLENE-DIAMIN-MONO-AUROCYANID AND PROCESS OF MAKING SAME.

1,115,609.   Specification of Letters Patent.   Patented Nov. 3, 1914.

No Drawing.   Application filed January 16, 1914.   Serial No. 812,576.

*To all whom it may concern:*

Be it known that we, GUSTAV SPIESS, Ph. D., professor of medicine, and ADOLF FELDT, Ph. D., doctor of medicine, citizens of the Empires of Germany and Russia, respectively, residing at Frankfort-on-the-Main, Germany, have invented certain new and useful Improvements in Dicantharidylethylene - Diamin - Mono - Aurocyanid and Processes of Making Same, of which the following is a specification.

It is known that the aurocyanid (AuCN) combined with alkali-cyanids in the form of double-salts possesses an intense power of arresting the development of pathogenetic microörganisms in the human and animal body. Now we have found that the best way of rendering the said aurocyanid less poisonous to animal and human organisms, without losing thereby its specific action upon microörganisms, is to form di-cantharidylethylene - diamin - mono - aurocyanid. This compound is obtained by causing an aqueous or alcoholic solution of cantharidylethylenediamin to act upon aurocyanid. The new body has most probably the formula:

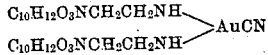

It is a light-yellow, crystalline product, readily dissolving in water with a slightly alkaline reaction.

The procedure for producing the new compound may, for instance, be as follows: 10 grams of cantharidylethylenediamin are dissolved in 50 cc. of absolute alcohol and heated with 5 grams of aurous cyanid in a closed-up tube to 100° C. for 6–8 hours while shaking. The small quantity of gold which separates is filtered off, the filtrate is evaporated *in vacuo* and the residue extracted with acetic ester. The undissolved portion is filtered off, washed with acetic ester and the substance thus obtained is recrystallized in a small quantity of absolute alcohol.

The cantharidylethylenediamin-mono-aurocyanid forms a yellowish, crystalline powder; it melts at 148–150° C.; it readily dissolves in water with a slightly alkaline reaction; when heated it decomposes, leaving metallic gold.

Having now described our invention, what we claim is:

1. The process of preparing di-cantharidylethylene-diamin-mono-aurocyanid, which consists in causing a solution of cantharidyl-ethylenediamin to act upon aurocyanid (AuCN).

2. As a new product, the di-cantharidylethylene - diamin - mono - aurocyanid, having most probably the formula:

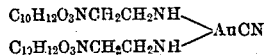

forming a yellowish crystalline powder, melting at 148–150° C., easily dissolving in water with a slightly alkaline reaction, and decomposing, when heated, leaving then metallic gold.

It testimony whereof, we affix our signatures in presence of two witnesses.

GUSTAV SPIESS.
ADOLF FELDT.

Witnesses:
  JEAN GRUND,
  CARL GRUND.